United States Patent [19]
Child

[11] 3,737,919
[45] June 12, 1973

[54] PIVOTED DISC-TYPE HEART VALVE
[75] Inventor: Francis W. Child, Maple Plain, Minn.
[73] Assignee: The Regents of the University of Minnesota, Minneapolis, Minn.
[22] Filed: Mar. 16, 1971
[21] Appl. No.: 124,754

[52] U.S. Cl.................... 3/1, 3/DIG. 3, 137/527.8
[51] Int. Cl.......................... A61f 1/22, A16k 17/12
[58] Field of Search............................ 3/1, DIG. 3; 137/527, 527.4, 527.8

[56] References Cited
UNITED STATES PATENTS

| | | | |
|---|---|---|---|
| 3,476,143 | 11/1969 | Kaster | 3/1 X |
| 3,546,711 | 12/1970 | Bokros | 3/1 |
| 3,579,645 | 5/1971 | Bokros | 3/1 |
| 3,416,159 | 12/1968 | Smeloff et al. | 3/1 |
| 460,223 | 9/1891 | Smith | 417/552 |
| 887,322 | 5/1908 | Fruin et al. | 137/527 |

FOREIGN PATENTS OR APPLICATIONS
169,745   9/1965   U.S.S.R..................... 3/DIG. 3

OTHER PUBLICATIONS

"A New Central-Flow Tilting Disc Valve Prosthesis" by V. O. Bjork, The Journal of Thoracic & Cardiovascular Surgery, Vol. 60, No. 3, pages 355-374, Sept. 1970.

Primary Examiner—Richard A. Gaudet
Assistant Examiner—Ronald L. Frinks
Attorney—Burd, Braddock & Bartz

[57] ABSTRACT

A heart valve having a base cooperating with a free floating pivoting disc to control the flow of blood through the valve. The disc has a substrate covered with a coating of silicon-alloyed Pyrolite carbon. The base can be a one-piece housing having side arms or two members joined together to confine the disc in a pivoting relationship with the housing. The disc pivots about a chordal axis and rotates about its center. The two members of the base have substrates with coatings of silicon-alloyed Pyrolite carbon.

21 Claims, 12 Drawing Figures

PATENTED JUN 12 1973          3,737,919
SHEET 1 OF 2
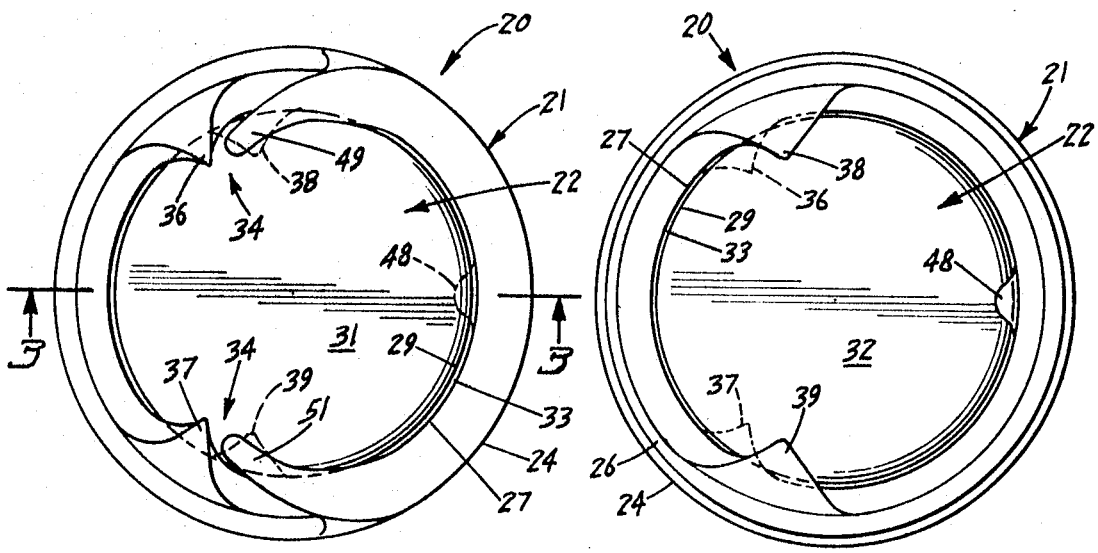
Fig.1            Fig.2
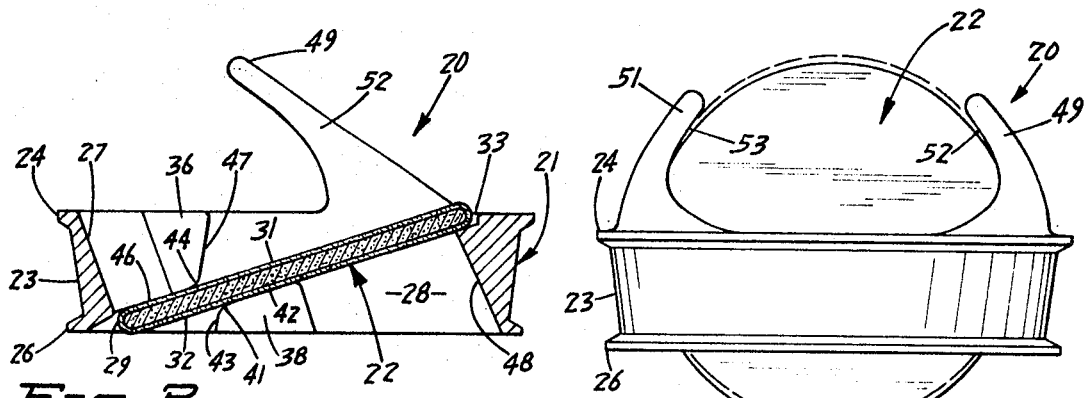
Fig.3            Fig.4
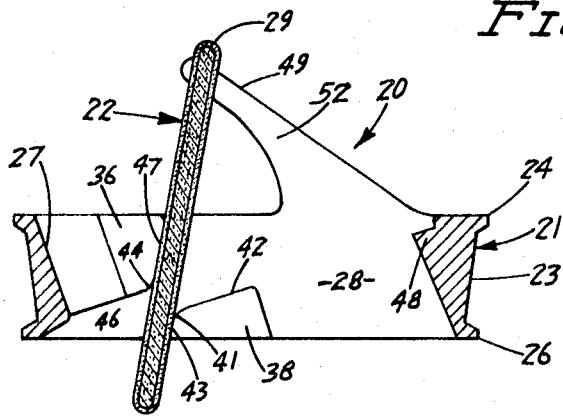   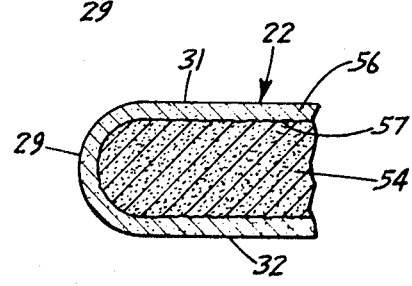
Fig.5            Fig.6
INVENTOR.
FRANCIS W. CHILD
BY
Buvd, Braddock & Bartz
ATTORNEYS INVENTOR.
FRANCIS W. CHILD
BY
Burd, Braddock & Barts
ATTORNEYS

PIVOTED DISC-TYPE HEART VALVE

BACKGROUND OF INVENTION

Heart valve prostheses are used in patients whose natural valves are damaged by congenital malformations or diseases and associated scarring and calcification. Numerous heart valve designs have been developed using either a ball, leaflet, or disc valving members. Each of these designs have certain advantages as well as deficiencies. They attempt but do not achieve the duplication of the healthy natural heart valve. Problems of prosthetic valves are largely due to the shape and operating structure of the valves and and the materials used in the valves. Some of the limitations of currently used heart valves are: 1. low efficiency and high pressure gradient across the valve; 2. high structural profile; 3) localized sites of wear and fatigue; 4. chemical breakdown and absorption of water and blood fluids; 5. regions of blood stagnation; 6) structures that cause turbulence, regurgitation and eddy currents in the blood flow; 7) structure that can result in formation of clot streamers; and 8) malfunction of the movable valving member.

Durability is a crucial factor in the clinical applicability of any heart valve as a heart valve must open and close approximately four million times a year. It is imperative that the material used in the heart valve be immune from biochemical degradation and mechanical failure due to wear and fatigue of rubbing or flexing of the components of the valve. Biodegradation is interrelated with mechanical failure as its biodegradation accelerates material fatigue and material breakdown. Rubbing and wear can accelerate the biochemical reaction, continually exposing new surfaces to the corroding media.

Leaf-type valves, as disclosed by Lord in U. S. Pat. No. 2,682,057 and Servelle in British Pat. No. 1,160,008, and disc-type valves, as disclosed by Wada in U. S. Pat. No. 3,445,863 and Bokros in U. S. Pat. No. 3,546,711, have low pressure gradients and fair flow characteristics. These valve designs are deficient as heart valves, as they have localized areas of wear and fatigue and have areas of blood stagnation.

De Laszlo, in U. S. Pat. No. 3,526,906, discloses prosthetic implants made from carbonaceous materials. The heart valve implant has a rigid base of carbon or graphite carrying a silicone rubber ball or a disc having legs of plastic material. Bokros, in U. S. Pat. No. 3,546,711, shows a carbon coated valve having a gate pivoted on a fixed pin.

Kaster, in U. S. Pat. No. 3,476,143, discloses several pivoting disc heart valves. Each valve has a one-piece metal base and a plastic or metal pivoting disc. Bjork has described a similar disc-type heart valve in the *Scandanavian Journal of Thoracic Cardiovascular Surgery* 3; 1-10, 1969. The base and disc pivoting structures of these valves are not adapted to be made entirely of rigid carbon materials. Parts of either the base or the pivoting structure must be movable or flexible to permit assembly of the disc into the base. The plastic materials used in the discs are, over a period of time, susceptible to biodegradation as they tend to take up moisture and other body fluids, proteins and enzymes which will eventually deteriorate the disc, inhibiting the operation of the valve. Also, the plastic materials do not have dimensional stability when subjected to steam autoclaving for sterilization.

SUMMARY OF INVENTION

The invention is directed to a heart valve prosthesis which has good efficiency with a low structural profile and, a central flow pattern with a minimum of eddying, turbulence and regurgitation. The valve when in the closed position has limited retrograde or reverse flow to provide a constant washing action and motion of the blood, materials used in the valve are lightweight in construction, have bio-compatibility, are non-degradable and have long-term wearability. One form of the heart valve incorporates a free floating silicon-alloyed Pyrolite carbon coated disc operatively associated with an annular valve housing. Commercial crystalline graphites which are usually formed by extruding or pressing mixtures of graphite powders and a binder have relatively low strengths. These materials are not suitable for use in prosthetic heart valves as they do not have the required wear resistance.

It has been found that Pyrolite carbons deposited as coatings or skins at low temperatures on clean, smooth surfaces have excellent thromboresistance. These skins are impermeable to gases and liquids and are much stronger and wear resistant than graphite carbons. Pyrolytic carbon has blood compatibility and is relatively inert toward blood plasmas, plasma proteins and plasma enzymes. Also, this material has dimensional stability, does not absorb moisture and blood fluids and is compatible to both tissue and blood cells. Silicon-alloyed Pyrolite carbon coatings are used to increase the wear resistant characteristics of the valve disc and valve base. The Pyrolite coatings or skins can be applied to a variety of substrates including metals, ceramics and graphite. These coatings are placed in a permanent compressive state to enhance the toughness and wearability of the coatings.

The heart valve has an annular base having an inner wall surrounding an opening through the base permitting the passage of blood in one direction through the valve. The free floating disc located in the opening is selectively movable to a first open position to allow flow of blood through said opening in one direction and movable to a second closed position to restrict the flow of blood in the opposite direction. When the disc is in the closed position, it is slightly smaller than the opening to allow for a limited or marginal retrograde or backflow of blood through the opening. This retrograde flow of blood is desirable to keep the blood in motion and prevent clot formation. The disc is a circular member having an annular uninterrupted peripheral edge and a substrate covered with a Pyrolite carbon coating. The disc is associated with pivot structures on the base to permit pivoting of the disc about a chord-like axis located between the diameter of the disc and an outer peripheral edge portion of the disc. The pivot structures also permit the disc to rotate freely about its center during its opening and closing movements. Co-operating with the pivot means are means to retain the disc in assembled relation with the base in the free floating manner.

In one form of the invention, the base has a first member having the pivot structure for the disc. Positioned over and secured to the first member is a second member having the means for retaining the disc in free floating assembled relation with the base. Both the first member and the second member can be coated with a Pyrolite carbon skin.

In the drawings:

FIG. 1 is a top plan view of the heart valve of this invention showing the disc in the closed position;

FIG. 2 is a bottom plan view of the valve of FIG. 1;

FIG. 3 is a sectional view taken along the line 3-3 of FIG. 1;

FIG. 4 is a side view of the valve shown in FIG. 1 with the disc in the open position;

FIG. 5 is a sectional view similar to FIG. 3 showing the disc in the open position;

FIG. 6 is an enlarged fragmentary sectional view of the outer peripheral portion of the disc;

Figures 7, 8:
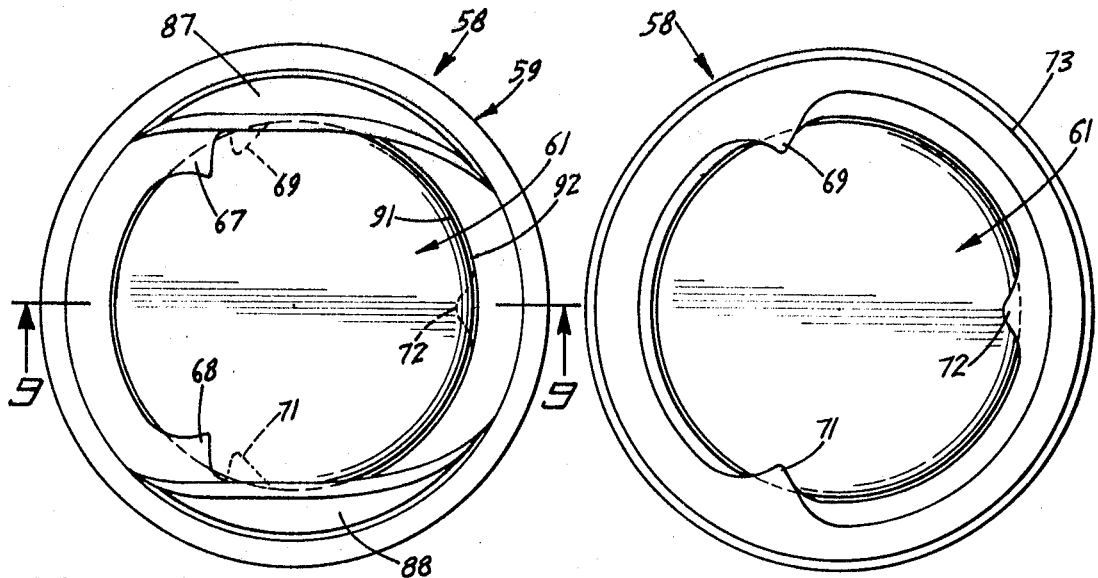
FIG. 7 is a top plan view of a modified heart valve of the invention.
FIG. 8 is a bottom plan view of the heart valve of FIG. 7.

Referring to the drawings, there is shown in FIGS. 1-5 a one-way valve or heart valve adapted for use in either mitral or aortic positions of a human heart. The valve indicated generally at 20 has a base or annular housing 21 associated with a movable disc 22. The disc 22 is a valving member or occluder which moves angularly from a closed position as shown in FIG. 3 to an open position shown in FIG. 4 and then back to the closed position in response to differential fluid pressures on opposite sides of the valve. The disc 22 is mounted in a free floating relationship in the base, being free to rotate about its center axis as it angularly moves its open and closed positions to control one-way movement of blood through the valve.

Base 21 has an outer annular side wall 23 located between an upper outwardly directed annular flange 24 and a lower outwardly directed annular flange 26. A sewing collar or suture ring (not shown) is mounted on wall 23 to provide structure for receiving sutures used to implant the valve in the heart. Base 21 has an inside generally cylindrical wall 27 surrounding the passage or opening 28 through the base. Disc 22 is operatively located in the passage 28 to permit substantially free central flow of blood through the passage 28 when the disc is in the open position, as shown in FIG. 5, and substantially block reverse flow of blood through the opening 28 when the disc 22 is in the closed position, as shown in FIG. 3.

The disc 22 is a flat circular member having a circular outer peripheral edge 29. The peripheral edge 29 has an annular uninterrupted circumferential configuration and is joined to a substantially flat top surface 31 and a substantially flat bottom surface 32.

As shown in FIGS. 1, 2 and 3, the diameter of the disc 22 is slightly smaller than the opening 28 when the disc is in the closed position, leaving a small annular space 33 between the outer peripheral edge 29 of the disc and the adjacent portion of the inside wall 27 of the base. This small space allows for limited reverse or retrograde flow of blood through the valve opening 28 when the disc 22 is in its closed position. The retrograde flow of blood prevents stagnation in pockets or pools of blood adjacent the valve base, as the blood is continuously moving through the valve passage 28.

The disc 22 is retained or held in free floating assembled relation with the base by pivot structures indicated generally at 34. The pivot structures 34 provide a pivot axis for the disc 22 that follows generally an imaginary chord line lying approximately an equal distance between the center of the valve passage 28 and the inside wall 27 measured along a transverse diametrical line. The pivot axis of the disc 22 can vary relative to the center of the disc during the opening and closing episodes of the disc as the disc has limited movement in its plane as it pivots. The pivot structures comprise upper or distal members 36 and 37 which extend over portions of the disc and into the opening. Members 36 and 37 are circumferentially spaced from each other. Located generally adjacent the upper members 36 and 37 are lower or proximal pivot members 38 and 39. Members 38 and 39 project into the opening and extend adjacent portions of the lower side 32 of the disc. Pivot members 36 and 38 are projections or pivot legs which function as fulcrums for the disc during its opening and closing movements.

Pivot members 37 and 39 are substantially identical to pivot members 36 and 38. The following detailed description is limited to pivot members 36 and 38. As shown in FIGS. 2, 3 and 5, the proximal pivot member 38 has a round fulcrum corner 41 joined to a top inclined face 42 and a generally upright face 43. Pivot member 36 has a fulcrum corner 44 facing the top face of the disc joining the inclined face 46 and a generally upright face 47. The faces 43 and 47 are generally parallel to each other. Faces 42 and 46 are generally parallel to each other. Substantially midway between the lower pivot members 38 and 39 is an inwardly directed stop or abutment 48 on housing 21 adapted to engage an outer peripheral portion of the disc 22. The lower pivot members 38 and 39 and stop 48 serve to support the disc in a generally inclined position with respect to the longitudinal axis of the passage 28 when the disc is in the closed position. Preferably this angle is about 18° from the horizontal plane of the base.

The disc 22 is maintained in free floating assembled relation with respect to the pivot structure 34 with retaining arms 49 and 51. The arms 49 and 51, integral with the top of the base 21, project upwardly and are inclined from the base in the direction of pivotal movement of the disc 22. The arms 49 and 51 each have inside surfaces or faces 52 and 53 which have a concave curvature larger than the curve or arc of the peripheral portion of the disc 22. The surfaces 52 and 53 curve inwardly toward the center line of the disc as shown in FIG. 4 and are located outwardly of or above the diameter of the disc so that the disc is retained in assembled relation with the base at all positions between its open and closed positions. The surfaces 52 and 53 follow a helical or spiral path as the radius of the arc of the surfaces increases toward the outer ends of the arms. The curvature of the surfaces 52 and 53 approaches the curvature of the pivot arc of the disc when the disc is in the closed position. This structure permits the disc to float and move upwardly during its opening episode, as indicated by solid and broken lines in FIG. 4.

FIG. 6 is an enlarged cross section of a portion of the disc 22 showing the disc substrate 54 entirely covered with a Pyrolite carbon coating or skin 56. A Pyrolite carbon substrate bond 57 firmly and positively joins the coating 56 to the substrate 54. For example, the substrate 54 can be a polycrystalline graphite coated with silicon-alloyed Pyrolite carbon. The carbon coating can have a Pyrolite carbon prime layer covered with a Pyrolite carbon finish coat. The silicon-alloyed Pyrolite carbon is deposited at low temperatures in two layers. The thermal coefficient of expansion of the substrate graphite is such that during the cooling after coating, the outer carbon layer is forced into a compressive state of stress which enhances the toughness and wear characteristics of the coating. The Pyrolite carbons are deposited in a fluidized bed from a hydrocarbon containing gaseous environment. These carbons are stronger and tougher than other bulk forms of carbon. The coatings can be applied to a variety of substrates including metal, ceramics and graphite. The substrates can have complex shapes without danger of delamination and cracking. The process of depositing carbons in this manner, developed by Gulf General Atomic Inc. of San Diego, California, is described in a publication entitled "Control of Structure of Carbon For Use in Bioengineering" published in *Engineering in Medicine - Bioceramics*, New England College, Henniker, New Hampshire, August 1970.

In use, when the disc 22 is in the closed position, as shown in FIGS. 1, 2 and 3, it is held in an inclined position in the passage 28 by the top inclined faces 42 of the proximal pivot members 38 and 39 and stop 48. The annular uninterrupted peripheral edge 29 of the disc 22 is spaced a slight distance from the adjacent side wall 27 of the housing whereby a limited reverse or retrograde flow of blood flows through the passage 28. An increase in the pressure of the blood on the proximal side of the disc 22 carries the disc 22 in a upward and angular direction along the excursional arc established by the inside surfaces 52 and 53 on the arms 49 and 51. The disc 22 pivots about distal pivot fulcrum corners 44. As the disc pivots to the open position, it is free to rotate about its central axis and move slightly in its plane. The entire disc moves a short distance upwardly as indicated by broken lines in FIG. 4. When the disc 22 is in the position, it is at a slight incline with respect to the longitudinal axis of the base. Preferably, the open angle of the disc 22 is between 75° and 80° with respect to the horizontal plane of the base. When the disc 22 is in the open position, it has a negligible obstruction to the flow of blood through the passage 28. The entire disc is laterally spaced or offset from the center of the axis. In the full open position, about one-fourth of the flow of blood passes through the smaller opening.

Figures 9, 10:
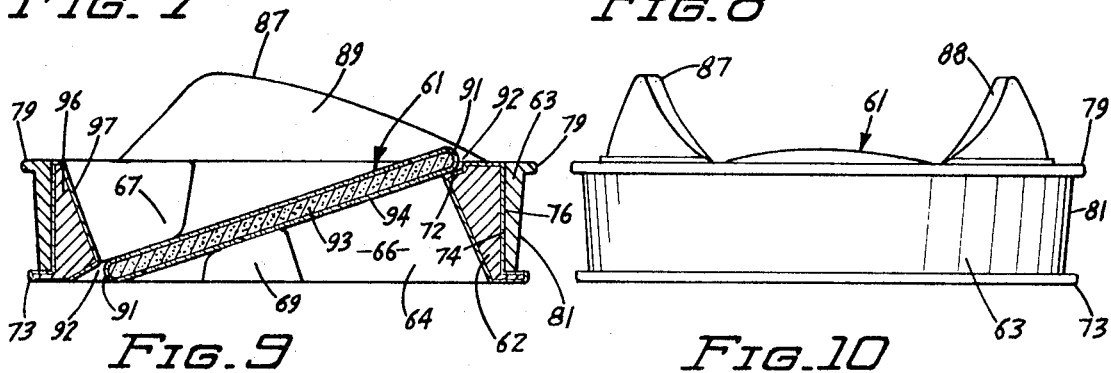
FIG. 9 is a sectional view taken along the line 9—9 of FIG. 7.
FIG. 10 is a side elevational view of the heart valve shown in FIG. 7.
Figure 11:
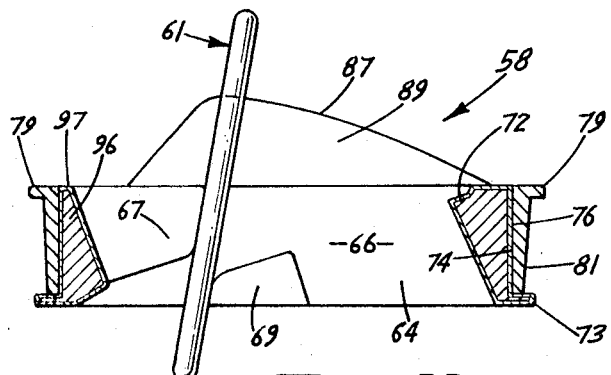
FIG. 11 is a sectional view of a heart valve similar to FIG. 9 showing the disc in the open position.

Referring to FIGS. 7-12, there is shown a modified heart valve indicated generally at 58 having an annular base or housing 59 and a disc 61. Housing 50 is a two piece structure having an inner member 62 and an outer member 63 having a coating or skin of Pyrolite carbon. The inner member 62 and outer member 63 may be made by investment casting or machining procedures as separate members and then assembled to operatively locate the disc 61 within the housing. The inner member 62 has an inside circumferential wall 64 forming a passage or opening 66 through the housing. Projected outwardly from the wall 64 are first distal pivots 67 and 68 and second proximal pivots 69 and 71. Located midway between the pivots 69 and 71 is a stop 72 for holding disc 61 in an inclined position when it is closed, as shown in FIG. 9. The lower portion of inner member 62 has an outwardly directed annular flange 73 and a cylindrical outer wall or face 74.

Figure 12:
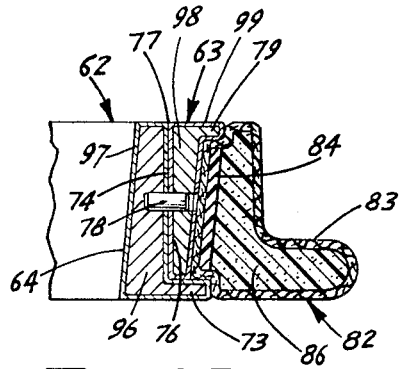
FIG. 12 is an enlarged sectional view of the valve housing in assembled relation with a sewing ring.

As shown in FIG. 12, outer member 63 has inside circumferential wall or face 76 of a size to fit with a close fit over the outer annular wall 74. A bonding agent or adhesive 77, as carbon cement, is used to secure the inner member 62 to the outer member 63. A locator pin 78 positioned in aligned holes in the inner member 62 and the outer member 63 is used to circumferentially orient the outer member 63 with respect to the inner member 62. The upper portion of outer member 63 has an outwardly directed annular flange 79 which forms with the lower flange 73 a recess or groove 81 adapted to accommodate a suturing member or sewing ring indicated generally at 82. As shown in FIG. 12, suturing member 82 has a cover 83 held in the groove 81 with a retaining sleeve 84. The cover 83 encloses a core of plastic material 86 that is compatible with human tissue and body fluids. The core 86 can be fluorosilicone rubber or similar synthetic resinous plastic material. The cover 83 is a biologically inert porous material that is compatible with chemicals and fluids of the body and does not deteriorate with time. An example of the suturing member is disclosed in U. S. patent application Ser. No. 817,988, now U.S. Pat. No. 3,623,212.

The outer member 63 has upwardly directed side members or shields 87 and 88. The side member 87 extends from pivot members 67 and 69 toward the stop 72. In a similar manner, the side member 88 extends from pivot members 68 and 71 toward stop 72. Each side member has a disc guide surface 89 which follows a large elliptical path to form the excursional arc of the disc. This path is larger than the arcuate dimensions of the outer peripheral edge 91 of the disc whereby the disc has limited floating movement during its opening episode. The guide surfaces 89 of side members 87 and 88 curve upwardly and inwardly so that they form retaining surfaces to hold the disc in floating assembled relation with the base. The surfaces 89 have a concave shape which is slightly larger than the curvature of the outer peripheral edge 91 of the disc.

As shown in FIG. 9, when the disc 61 is in the closed position, it rests on the top surfaces of the proximal pivots 69 and 71 and stop 72. The outer peripheral uninterrupted edge 91 of the disc is spaced a small distance 92 from the adjacent portions of the inside wall 64 of the housing, thereby providing a small annular space 92. When the disc 61 is closed, a limited amount of blood can flow through the opening 66.

The disc 61 has a substrate 93, preferably of graphite, covered with a coating or skin of Pyrolite carbon 94 similar to disc 22 shown in FIG. 6. The inner member 62 has a body or substrate 96, preferably of graphite, carrying a coating or skin 97 of Pyrolite carbon whereby all pivot portions and the stop 72 have a Pyrolite carbon skin. As shown in FIG. 12, the outer member 63 can have a substrate 98 covered with a coating or skin 99 of Pyrolite carbon.

In use, with the disc 61 in the closed position as shown in FIG. 9, an increase in the pressure of the blood on the proximal side of disc 61 will angularly pivot the disc to the open position about an axis offset from the diameter of the disc. The blood is free to flow through passage 66 on both sides of the disc 61. The disc, as it pivots to the open position, is free to float upwardly and rotate around its central axis as the excursional arc provided by the guide surfaces 89 of side members 87 and 88 is slightly larger than the arc of the peripheral edge 91 of the disc.

A decrease in the pressure of the blood on the proximal side of the disc 61 will quickly return the disc to its closed position. The disc will initially drop and pivot about proximal pivots 69 and 71 as a portion of the disc strikes the stop 72. During the closing episode of the disc, the disc is free to rotate about its central axis.

The embodiments of the invention in which an exclusive property or privilege is claimed are defined as follows:

1. A heart valve for controlling the flow of blood comprising: base means having an outer side adapted to accommodate a sewing ring and an inner wall surrounding an opening through the base means; disc means positioned in said opening operable to selectively move to a first open position to allow flow of blood through said opening in one direction and to a second position to restrict the flow of blood in the opposite direction through said opening, said disc means comprising a circular disc having an annular uninterrupted outer peripheral edge cooperating with said inner wall to restrict the flow of blood through said opening when the disc is in the closed position, said disc having a substrate and a Pyrolite carbon coating covering the substrate; pivot means for pivoting the disc about an axis located between the diameter of the disc and an outer peripheral edge portion of the disc; and retaining means cooperating with said pivot means to hold the disc in assembled relation with said base means in a manner so that the disc is free to rotate relative to the axis thereof and free to pivot on the pivot means between the open position and the closed position, said retaining means having surfaces for guiding the disc along a curved path between the open position and closed position thereof and allowing the disc greater lateral movement when the disc is in the open position than when the disc is in the closed position.

2. The heart valve of claim 1 wherein: the outer peripheral edge of the disc is spaced inwardly from the inner wall of the base means when the disc is in the closed position, thereby allowing limited reverse flow of blood through the space between the outer peripheral edge of the disc and inner wall of the base means when the disc means is in the closed position.

3. The heart valve of claim 1 wherein: the retaining means cooperating with said pivot means are arms located on opposite sides of the base means, each arm projected upwardly and curved inwardly and having an inside surface following a spiral path larger than the curvature of the outer peripheral edge of the disc.

4. The heart valve of Claim 3 wherein: the spiral path on the inside surface of each arm approaches the curvature of the disc when the outer peripheral edge of the disc is in the closed position.

5. The heart valve of Claim 1 wherein: the pivot means includes pairs of projections directed into said opening, each pair of projections having a first member on one side of the disc and a second member on the opposite side of the disc.

6. The heart valve defined in Claim 1 wherein: the base means has at least one stop projected inwardly from said inner wall which is engaged by disc means when disc means is in the closed position.

7. The heart valve of Claim 1 wherein: the pivot means includes at least one member on the base means which is engaged by the disc means when the disc means is in the closed position to hold the disc means at an inclined position with respect to the normal plane of the axis of the opening of the base means.

8. The heart valve of Claim 1 wherein: said pivot means have upwardly directed faces which engage the portions of the disc means when the disc means is in extreme open position to thereby define the maximum open position of the disc means.

9. The heart valve of Claim 1 wherein: the substrate of the disc means is graphite and the Pyrolite carbon coating is a silicon-alloyed Pyrolite coating having at least two layers.

10. The heart valve of Claim 1 wherein: the disc has flat upper and lower surfaces that are parallel to each other and said annular uninterrupted peripheral edge is rounded and blends smoothly with both of said surfaces.

11. A heart valve for controlling the flow of blood comprising: base means having an inner wall surrounding an opening through the base means, disc means operable to selectively move to an open position allowing the flow of blood in one direction through the opening and into a closed position to restrict the flow of blood in the opposite direction through the opening, said disc means having an annular uninterrupted outer peripheral edge cooperating with said inner wall to restrict the flow of blood through said opening when the disc means is in the closed position, pivot means attached to the base means locating the disc means in said opening and allowing pivotal movement of the disc means relative to the pivot means and rotation of the disc means relative to the central axis thereof, and retaining means cooperating with said pivot means to hold the disc means in assembled relation with said base means, said retaining means having means for guiding the disc means along a curved path between the open position and closed position thereof and allowing the disc means greater lateral movement when the disc means is in the open position than when the disc means is in the closed position.

12. The heart valve of Claim 11 wherein: the disc means is a circular generally flat disc having a substrate and a coating of Pyrolite carbon covering the entire substrate.

13. The heart valve of claim 11 wherein: the retaining means comprise side means attached to the base means, said means guiding the disc means comprising inside surfaces on the side means following a spiral path larger than the curvature of the outer peripheral edge of the disc means, 14. The heart valve of claim 13 wherein: the spiral path on the inside surfaces of the side means approaches the curvature of the outer peripheral edge of the disc means when the disc means is in the closed position.

15. The heart valve of Claim 11 wherein: the pivot means are located on the base means in positions for pivoting the disc means about an axis located between the diameter of the disc means and an outer peripheral edge portion of the disc means.

16. The heart valve of Claim 11 wherein: said annular uninterrupted peripheral edge has a circumference which is slightly smaller than the inner wall of the base means, thereby allowing limited reverse flow of blood through the opening in the base means when the disc means is in the closed position.

17. The heart valve of Claim 11 including: means engageable by the disc means when the disc means is in the closed position to hold the disc means in an inclined position with respect to a plane normal to the axis of the opening of the base means.

18. The heart valve of Claim 11 wherein: said base means has a first member and a second member secured to the first member, said pivot means having at least one pivot member secured to the first member, said retaining means being attached to the second member.

19. A heart valve for controlling the flow of blood comprising: base means having a portion adapted to accommodate means for attaching the heart valve to heart tissue and an inner wall surrounding an opening through the base means allowing blood to flow through the base means, disc means positioned in said opening operable to selectively move to a first open position to allow the flow of blood through said opening in one direction and to a second closed position to restrict the flow of blood in the opposite direction through said opening, said disc means having a Pyrolite carbon outer skin and an annular uninterrupted outer peripheral edge spaced inwardly from the inner wall of the base means when the disc means is in the closed position thereby providing an annular space between the outer peripheral edge and the inner wall allowing limited annular reverse flow of blood through the annular space when the disc means is in the second closed position, means for maintaining the disc means in assembled relation with the base means in a manner so that the disc means is free to rotate relative to its central axis and is free to pivot between an open position and a closed position thereof, said means for maintaining the disc means in assembled relation with the base means cooperating with the disc means to hold the disc means in an inclined position with respect to the plane normal to the axis of the opening in the base means when the disc means is in the closed position, said means for maintaining the disc means in assembled relation with the base means comprising first means located on one side of the disc means engageable with said disc means during movement of the disc means from the closed position to the open position and second means on the opposite side of the disc means contacting said disc means during movement of the disc means from the open position to the closed position, said second means having fulcrum surfaces cooperating with said disc means during the closing movement thereof to define a disc pivot axis which moves from an offcenter position toward a diameter of the disc means, and third means having surfaces for guiding the disc means along a curved path between the open position and the closed position thereof and allowing the disc means greater lateral movement when the disc means is in the open position than when the disc means is in the closed position.

20. The heart valve of claim 19 wherein: the third means are arms located on opposite sides of the base means, each arm projected upwardly and curved inwardly and having an inside surface following a spiral path larger than the curvature of the outer peripheral edge of the disc means.

21. The heart valve of claim 20 wherein: the spiral path on the inside surface of each arm approaches the curvature of the outer peripheral edge of the disc means when the disc means is in the closed position.

* * * * *

PO-1050
(5/69)

UNITED STATES PATENT OFFICE
CERTIFICATE OF CORRECTION

Patent No. 3,737,919           Dated June 12, 1973

Inventor(s) Francis W. Child

It is certified that error appears in the above-identified patent and that said Letters Patent are hereby corrected as shown below:

Column 1, line 15, "1." should be --1)--;
         line 16, "2." should be --2)--;
         line 17, "4." should be --4)--;
         line 19, "5." should be --5)--.

Column 3, line 37, after "moves", insert --between--.

Column 5, line 42, after "the", second occurrence insert --open--
         line 54, "50" should be --59--.

Signed and sealed this 26th day of March 1974.

(SEAL)
Attest:

EDWARD M.FLETCHER,JR.
Attesting Officer

C. MARSHALL DANN
Commissioner of Patents